United States Patent
Kessler

(10) Patent No.: US 6,741,288 B1
(45) Date of Patent: May 25, 2004

(54) METHOD AND APPARATUS FOR MAINTAINING A DIGITAL TELEVISION RECEIVER DATABASE

(75) Inventor: Damien Kessler, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 700 days.

(21) Appl. No.: 09/615,316

(22) Filed: Jul. 13, 2000

(51) Int. Cl.[7] ............ H04N 7/12; H04N 11/02; H04N 11/04
(52) U.S. Cl. ............ 348/385.1; 348/554; 725/50; 725/134; 725/142
(58) Field of Search ............ 725/48, 49, 50, 725/134, 142; 348/554, 385.1, 471, 472

(56) References Cited

U.S. PATENT DOCUMENTS

| | | | | |
|---|---|---|---|---|
| 5,444,491 A | * | 8/1995 | Lim ............ | 348/441 |
| 6,072,983 A | * | 6/2000 | Klosterman ............ | 725/49 |
| 6,191,821 B1 | * | 2/2001 | Kupnicki ............ | 348/512 |
| 6,313,886 B1 | * | 11/2001 | Sugiyama ............ | 348/731 |
| 6,473,129 B1 | * | 10/2002 | Choi ............ | 348/465 |
| 6,621,528 B1 | * | 9/2003 | Kessler et al. ............ | 348/734 |

* cited by examiner

Primary Examiner—Vivek Srivastava
Assistant Examiner—Matthew Demicco
(74) Attorney, Agent, or Firm—Finnegan, Henderson, Farabow, Garrett & Dunner, LLP

(57) ABSTRACT

A method and apparatus for building and maintaining a database in a digital television receiver from information received in MPEG and PSIP tables uses the MPEG tables as a master to facilitate creating, updating, and deleting the database. Each database entry is encapsulated in a memory chain control structure such that freeing memory does not require consideration of the specific content of data in the database.

28 Claims, 12 Drawing Sheets

METHOD AND APPARATUS FOR MAINTAINING A DIGITAL TELEVISION RECEIVER DATABASE

BACKGROUND

The invention relates generally to digital television receivers and, more particularly, to the methods and apparatus for building and maintaining a database within a digital television receiver.

A new type of broadcast television has recently been introduced to consumers in the United States and other countries. This system is known as digital television ("DTV"). Instead of transmitting audio and video information in the form of analog signals as has been done for over 50 years, exciting new programming incorporating a host of new and higher quality features is now being transmitted by local and satellite broadcasters in the form of digital signals. These signals consist of individuals bits of digital data grouped into packets of various types, including audio packets, video packets, and system control data packets.

The system control data packets contained in digital broadcast streams include information concerning the available channels and the programs they contain. In order for a digital television receiver to tune to a specific program and provide the user with relevant information, the receiver must gather and store the transmitted system control data in a database.

In the U.S., the Advanced Television Systems Committee (ATSC) has specified the standard according to which digital television signals must be transmitted. The ATSC standard is in turn based on an international standard popularly known as MPEG-2, hereinafter referred to for convenience as simply "MPEG."

The MPEG standard defines a way to carry basic system control data in a set of tables, the major tables being the Program Association Table (PAT) and the Program Mapping Table (PMT). However, the ATSC standard does not make the use of these tables mandatory.

The ATSC has defined a format called the Program and Specific Information Protocol (PSIP) for the purpose of carrying a more extended set of data in a different set of tables. These tables include the Master Guide Table (MGT), Version Control Table (VCT), Event Information Table (EIT), and others. Use of the PSIP tables is also not mandatory; however, the PSIP standard is the preferred way to transmit system information in an ATSC digital stream. Detailed descriptions of MPEG data and tables is contained in ISO/IEC 13818-1 "Coding of Moving Pictures and Associated Audio-Part 1: Systems." Detailed information regarding PSIP data and tables is contained in the publication ATSC A/65 "Program and Specific Information Protocol for Terrestrial Broadcast and Cable" published by the Advanced Television Systems Committee. The disclosures of both of these documents are hereby expressly incorporated by reference.

In view of the permissive nature of standards in the U.S., digital television signals transmitted by various broadcasters can differ significantly in format. A typical situation would be for both MPEG and PSIP tables to be present in a broadcast digital television signal. In such cases, some pieces of system control information are redundant and may be found in both MPEG and PSIP tables, whereas other pieces may be included in only one set of tables. The database stored and maintained by the digital television receiver must permit merging of system control data derived from both MPEG and PSIP tables. Although the ATSC standard requires data in the MPEG and PSIP tables to be consistent if both are present, this does not always happen with real-world signals actually transmitted by broadcasters. Inconsistency of transmitted system control data can thus give rise to incoherency of the database. Further complicating the task of building and maintaining the database is the fact that every time the structure of a program is modified (change in number of elementary streams, new content rating, etc.), updated tables carrying the corresponding information are transmitted. However, the two sets of updated tables may or may not be received simultaneously.

The procedure for updating tables is completely defined within each standard (MPEG and PSIP). However, merging the data coming from two "independent" sets of tables can cause problems. For example, during a transition period, it is likely that one set of tables will still be carrying the old information while the other set is already updated with the new information, that is, the new information is not consistent with the old information. Once again, this raises the possibility of incoherent database content due to a mismatch between the MPEG and PSIP tables. It is therefore desirable to provide methods and apparatus for efficiently storing and maintaining a database in a digital television receiver that insures integrity and coherence of the database during merging and updating operations.

SUMMARY OF THE INVENTION

A method consistent with the present invention maintains a database for display of digital television broadcast signals carried by a digital broadcast stream including content data and system control data. The system control data includes first information relating to a first broadcast standard and optionally also includes second information relating to a second broadcast standard. The method comprises receiving the digital broadcast stream, extracting the first information from the system control data, storing a first set of data entries from the extracted first information, extracting second information from the system control data if second information is present in the system control data, and storing a second set of data entries only if the extracted second information is consistent with previously stored first set of data entries.

A system consistent with the present invention maintains a database for display of digital television broadcast signals carried by a digital broadcast stream including content data and system control data. The system control data includes first information relating to a first broadcast standard and optionally also includes second information relating to a second broadcast standard. The system comprises a tuner which receives the digital broadcast stream and a demultiplexer which extracts the first information from the system control data. The system also comprises a control module which stores a first set of data entries from the extracted first information, extracts second information from the system control data if second information is present in the system control data, and stores a second set of data entries only if the extracted second information is consistent with previously stored first set of data entries.

BRIEF DESCRIPTION OF THE DRAWINGS

The accompanying drawings, which are incorporated in and constitute a part of this specification illustrate the invention and, together with the description, served to explain the principals of the invention.

DESCRIPTION OF THE PREFERRED EMBODIMENTS

Reference will now be made in detail to preferred implementations consistent with the present invention, an example of which is illustrated in the accompanying drawings.

Figure 1:
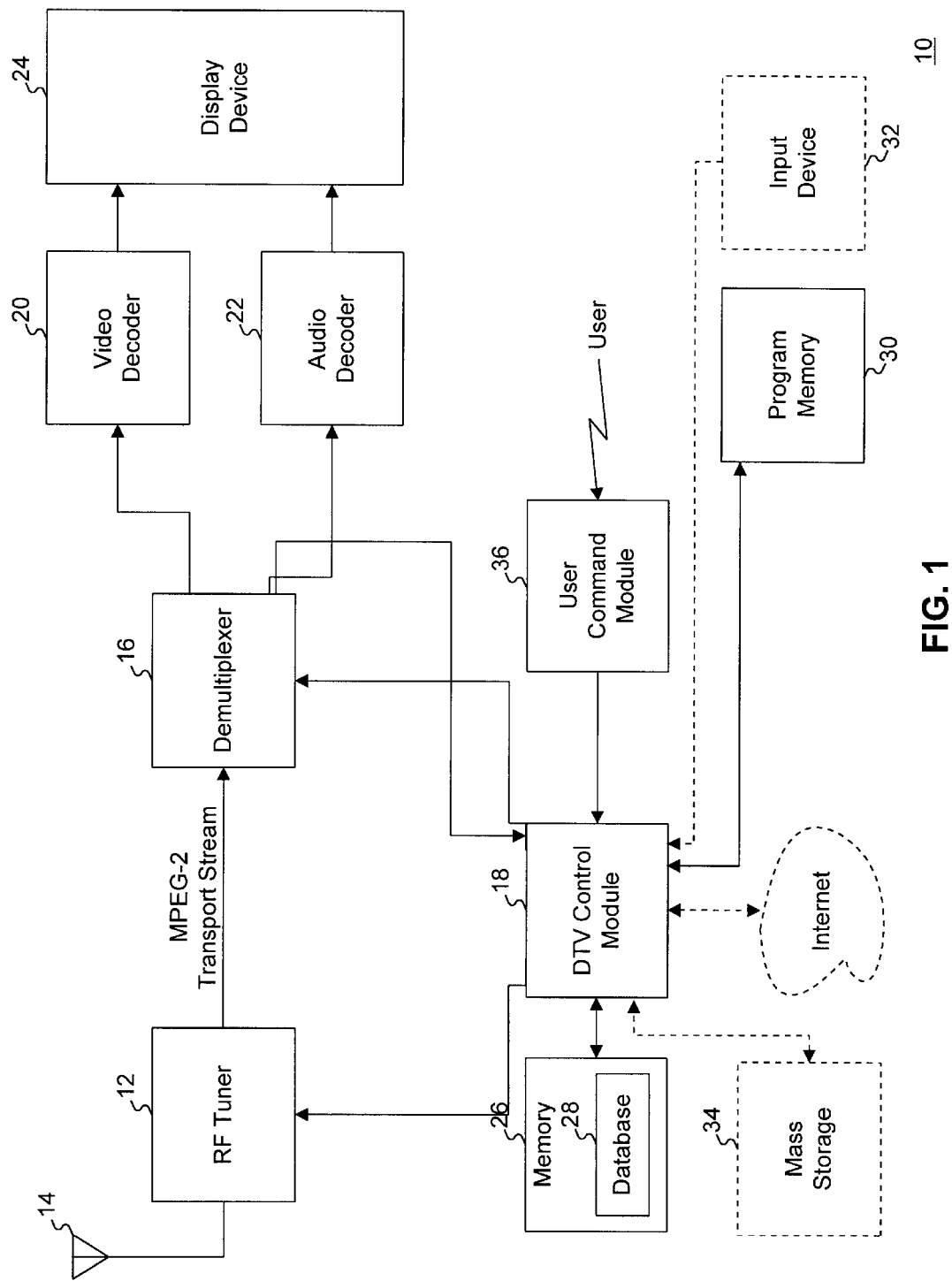
FIG. 1 is a block diagram of a digital television receiver consistent with the present invention.

FIG. 1 is block diagram of a digital television receiver 10 consistent with the present invention. Receiver 10 includes a radio frequency (RF) tuner 12 adapted for connection to a source of digital television broadcast signals, such as a UHF/VHF antenna 14. As is well known by those skilled in the art, tuner 12 may be connected to other sources, such as a satellite antenna or a CATV cable.

Tuner 12 receives commands from a control module 18 to tune to a specific RF frequency containing a desired digital television signal including a transport stream transmitted according to MPEG standards. Tuner 12 then supplies the desired transport stream to a demultiplexer 16.

The transport stream supplied by tuner 12 includes packets of data multiplexed to form several different programs. Each program includes several series of packets ("elementary streams"), including content data (video data, audio data, foreign language audio data, etc.) and system control data. Each packet includes a Packet Identifier (PID) which uniquely specifies the stream to which it belongs. For example, the stream of packets carrying the video data for a specific program would each have a specific PID, the stream of packets carrying the English audio for that program would each have another specific PID, etc.

Demultiplexer 16 receives commands, including one or more PIDs, from control module 18 to select a desired program. Demultiplexer 16 selects the video, audio, and system control data packets for the desired program according to the PIDs in the received commands and routes the packets respectively to a video decoder 20, an audio decoder 22, and control module 18. All other packets of the transport stream, having PIDs other than those supplied to demultiplexer 16 by control module 18, are ignored by demultiplexer 16. Video decoder 20 and audio decoder 22 respectively extract video and audio information from video and audio packets and supply the video and audio information in an appropriate format to a display device 24. Display device 24 may consist of a CRT, liquid crystal, or plasma video display device and one or more speakers for playing audio.

Control module 18 is also connected to a random access memory (RAM) 26, within which is stored a database 28, and to a program memory 30 which preferably constitutes a flash memory or other type of programmable non-volatile memory. Program memory 30 stores instructions for tasks executed by control module 18. Receiver 10 may also include an input device 32 such as a CD-ROM reader and a mass storage device 34 such as a hard disk.

Control module 18 is also connected to a user command module 36 which receives commands from the user, or viewer, allowing the viewer to select and control the display of desired programs. User command module 36 preferably includes an infrared receiver capable of receiving commands from a hand-held infrared remote control unit in a manner well known in the art. Control module 18 may also be connected to a network such as the Internet.

Various tasks are executed by control module 18, either automatically or in response to viewer commands. Examples of such tasks include "channel selection," "autoprogramming," "channel up" and "channel down," "channel jump," "CC enable," "parental control (V chip)," etc. Although the functions of tuner 12, demultiplexer 16, control module 18, decoders 20 and 22, and user command module 36 may be implemented using discrete integrated circuits and a general purpose microprocessor such as a Pentium III, these functions are preferably implemented using a multimedia processor such as a Trimedia PNX2700 chip.

Figure 2:
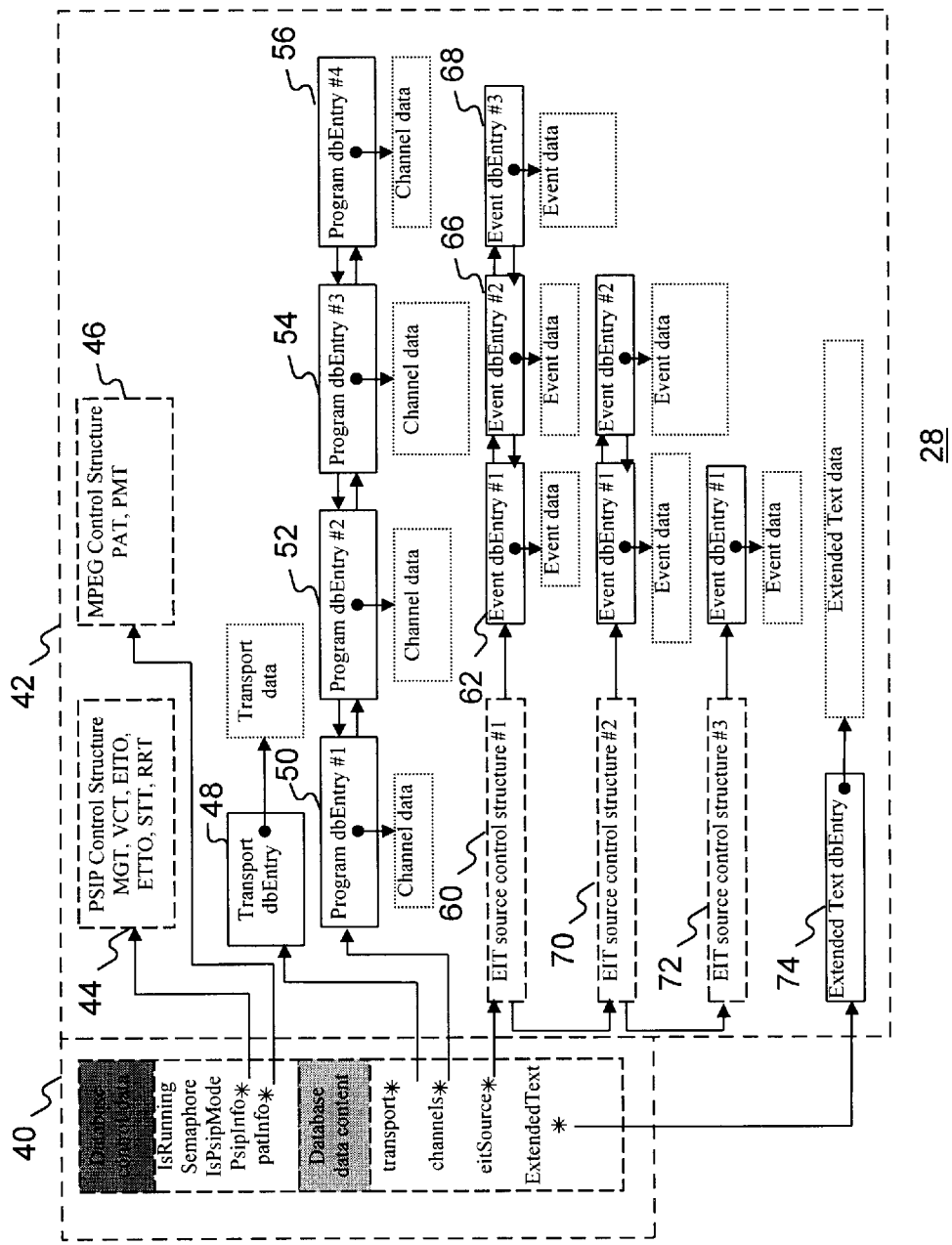
FIG. 2 is a block diagram of a database contained in the digital television receiver of FIG. 1.

FIG. 2 is a block diagram of database 28. As shown therein, database 28 includes a top layer 40 and a content section 42. Top layer 40 is made up of control parameters and a series of fields pointing to data within content section 42. The main control fields of top layer 40 are the following:

IsRunning: set to 1 when the database is active, set to zero when the database is inactive (and thus empty)

Semaphore: protects the database so that its content can not be modified simultaneously by several tasks.

IsPsipMode: set to 1 if the current stream contains PSIP tables, set to 0 if the stream only contains MPEG tables.

PsipInfo: contains the address of a PSIP control structure 44, which is used to control the decoding and update of the PSIP tables.

PatInfo: contains the address of an MPEG control structure 46, which is used to control the decoding and update of the MPEG tables.

Pointers in top layer 40 point to addresses in content section 42, as follows:

transport: contains the address of a transport dbEntry 48, if any. The transport dbEntry main field is the Transport Stream ID, or TSID, that uniquely identifies this transport stream from all the other transport streams the system can tune to.

channels: contains the address of the first element of a list of Program dbEntries 50, if any. Each Program dbEntry provides information regarding a specific program that is present in the transport stream (mainly major and minor numbers if any, number and type of the elementary streams the program is made up of and how to select this specific program). All the Program dbEntries are chained together, using the next and previous fields present in the basic structure of a dbEntry element, as set forth in detail below.

eitSource: contains the address of the first element of a list of EIT source control structures 60, if any. Each source control structure points in turn to the first element of a list of event dbEntries. A source can be seen as a description of a program content. Each program is associated with a source (several programs can be associated with the same source in case their program content is the same). A source provides a list of events that covers a period of time of 3 hours. One of the events is the current one, the others are either past or upcoming events. Each event dbEntry contains a brief description of what the program is all about, as well as some other pieces of information such as rating information, Closed Captioning information, etc. The event dbEntries are chained together the same way as the program dbEntries.

ExtendedText: contains the address of an Extended Text dbEntry 74, if any. The extended Text dbEntry contains a longer text description of the event that the user is currently watching.

As noted above, the MPEG and PSIP tables received in the Transport Stream each contain unique information as well as information in common. If both table sets were each used to create, update, and delete information in the database as the tables were received, problems could occur when there is an inconsistency between the PSIP and MPEG tables, during, for example, the transition period between new table versions when trying to merge the new PSIP table information with the not-yet-updated PAT table information. Accordingly, a method consistent with the present invention uses one set of tables as a master for the database creation, update, and deletion process and uses the second set only to update already existing entries after ensuring the coherency of the information provided by the second set. If there are any inconsistencies, the information from the second set is discarded.

A method consistent with the present invention uses the MPEG table set as master for the following reasons. All current broadcast streams carry the basic MPEG tables. Moreover, MPEG tables are simpler to use than the PSIP tables and are usually error free, which is not always the case for the PSIP tables. Furthermore, adding PSIP information to a broadcast stream requires that the broadcaster employ a specific piece of equipment, a PSIP encoder. Since not all broadcast stations own a PSIP encoder, many digital programs are currently broadcast without any PSIP information at all. Although the embodiment described herein uses MPEG tables as master, those skilled in the art will recognize that in other applications with different requirements, the PSIP tables could be selected as master.

As shown in FIG. 2, the PSIPInfo pointer points to control structure 44 for PSIP information derived from the Master Guide Table (MGT), the Virtual Channel Table (VCT), the Event Information Table (EIT), the Extended Text Table (ETT), the System Timetable (STT), and the Rating Region Table (RRT) transmitted in the broadcast stream. The PSIP control structure includes information such as MGT and VCT version numbers; EITO and ETTO PIDs (if any), the number of sections of the VCT table, the Extended Text ETM ID, etc.

The patInfo pointer points to the starting address in the RAM memory 26 for MPEG control structure 46. This includes control information from the PAT and MPTs such as version number, a summary of each section, and information needed to decode the list of all program numbers and PMT packet identifiers (PIDs).

As briefly noted above, the transport pointer points to the starting address in RAM memory 26 for Transport dbEntry 48, and the channels pointer points to the starting address in RAM memory of a first Program dbEntry 50. The first Program dbEntry 50 includes a pointer to a second Program dbEntry 52 containing similar data for a second program currently available for display. Similarly, additional Program dbEntries 54 and 56 contain channel data for other programs currently available for display. Thus, each program currently available for display has a corresponding Program dbEntry in data base 28.

As indicated in FIG. 2, each Program dbEntry 50, 52, 54 and 56 is linked to the adjacent dbEntries. Further details of the specific construction of the database will be provided below.

The eitSource pointer points to first EIT source control structure 60. The EIT source control structure 60 in turn includes a pointer to a first Event dbEntry 62. In a manner similar to a program dbEntry 52, Event dbEntry 62 is linked to additional Event dbEntries 66 and 68.

Since there may be multiple instances of EITO tables, EIT source control structure 60 also includes a pointer to a second EIT source control structure 70 which in turn contains a pointer to an additional EIT source control structure 72. EIT source control structures 70 and 72 include pointers to Event dbEntries in the same manner as EIT source control structure 60.

The ExtendedText pointer points to the start address in RAM memory 26 of extended text dbEntry 74.

Program memory 30 (FIG. 1) includes instructions for control module 18 to execute a method for maintaining database 28 for display of digital television broadcast signals carried by a digital broadcast stream that includes content data and system control data. The system control data includes first information relating to a first broadcast standard and optionally includes second information relating to the second broadcast standard.

Figure 3:
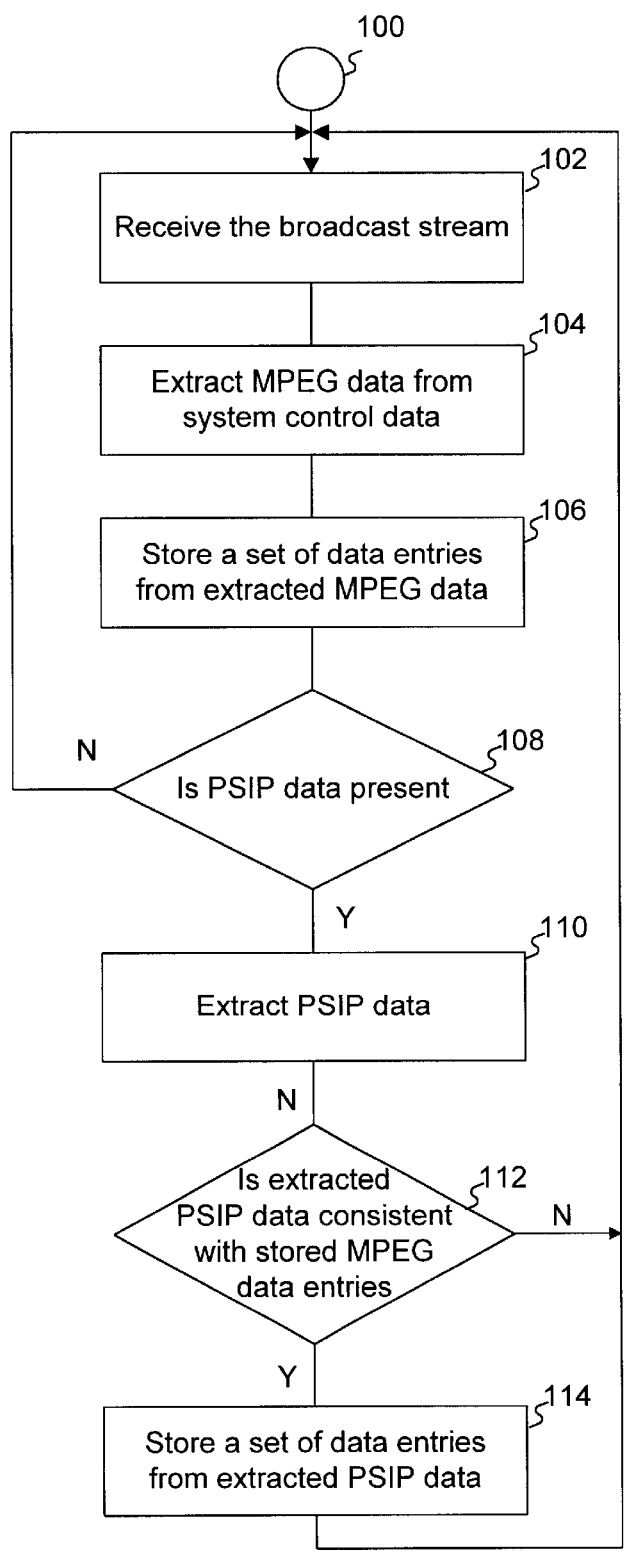
FIG. 3 is a data flow chart illustrating a method, consistent with the present invention, for building the database of FIG. 2.

A method consistent with the present invention is shown in FIG. 3. Execution begins at stage 100 and continues at stage 102, where the method receives the broadcast stream of packets. Next, at stage 104, the first information, namely, MPEG data, is extracted from the system control data of the broadcast stream. At stage 106, a set of data entries from the MPEG data is stored in RAM memory 26. At stage 108, the method determines if second information, namely, ATSC PSIP data, is present in the broadcast stream. If not, the method turns to stage 102 and receives an additional packet of data.

If PSIP data is present at stage 108, the PSIP data is extracted at stage 110. The method then determines, at stage 112 if the extracted PSIP data is. consistent with stored MPEG data entries. If and only if the extracted PSIP data is consistent, the method at stage 114 stores a set of data entries in database 28 from the extracted PSIP data. If the extracted PSIP data is not consistent with stored MPEG data entries, the PSIP data is ignored and the method returns to step 102 to receive additional packets.

As explained above with respect to FIG. 2, database 28 includes a plurality of types of entries, referred to as "dbEntries." Each entry takes up a different amount of memory, depending upon the number of variables contained in the dbEntry type and the number of related descriptors present in the broadcast stream. In order to efficiently manage the creation and maintenance of database 28 in RAM memory 26, a method consistent with the present invention provides that when a dbEntry is created, a portion of memory corresponding to the minimum size of this particular type of dbEntry is first allocated. Then, every time additional information for the first dbEntry, such as a descriptor, is decoded, another portion of memory is allocated to store the additional data. Thus, a dbEntry does not consist of a single contiguous stretch of allocated memory but rather a collection of several noncontiguous portions. The dbEntry basic structure contains pointer fields that point to the other portions of memory. Each descriptor in turn might also contain a local descriptor, which would require another portion of memory to be allocated. The address of a new portion is then stored in one of the fields of the parent descriptors.

In order to facilitate the deletion of a dbEntry when the associated data becomes obsolete, a method consistent with the present invention provides a linkage system that is independent of the format and data amount of the dbEntry itself. Each portion of the memory that is allocated is in fact made up of two sections: a "data" section, composed of the dbEntry data itself (and pointers described above with respect to FIG. 2), and a "link" section containing a pointer to the beginning address of the next portion of memory pre-allocated for this specific dbEntry. All of the portions of memory belonging to the same dbEntry are thus chained together, forming a structure called a "memchain." When a dbEntry is created, a memchain control structure is first allocated and a unique memchain ID is assigned to the new chain/dbEntry. Then, a first portion of the memory is allocated and its address is stored in a field of a control structure. Every time a new portion of a memory is allocated, it is chained to the last allocated portion.

In order to delete the dbEntry, the only action necessary is to read the memchain ID present in the dbEntry basic structure, access the corresponding memchain control structure, go through the pointers, and free the portions of memory one by one. No knowledge of the specific data contained within the dbEntry is thus required.

As noted above, various tasks executed in control module 18 can access portions of database 28. Therefore, when new system control data is received over the transport stream rendering existing data in database 28 obsolete, special attention must be paid prior to the removal of the dbEntry. Thus, a method consistent with the present invention prohibits the freeing of memory allocated to a dbEntry that is currently being queried by a task of DTV control module 18. Accordingly, each basic dbEntry includes, in its link section, a reference field manipulated by external tasks to indicate pending uses of a corresponding data entry by external task. When a dbEntry is created, the reference field is set to 1. Every time a task queries a dbEntry, its reference field is incremented by 1. Every time the task completes a query, the reference field is decremented by 1. Accordingly, when a dbEntry is determined to be obsolete, it is first removed from the list of dbEntries it belongs to, and its reference field is decremented by 1. If its reference field is then set to 0 (i.e. no task is currently querying the dbEntry), the memory occupied by the dbEntry is freed immediately. Otherwise, the memory is freed when the last task completes its use of the dbEntry (thus setting the corresponding reference field to 0).

Figure 4:
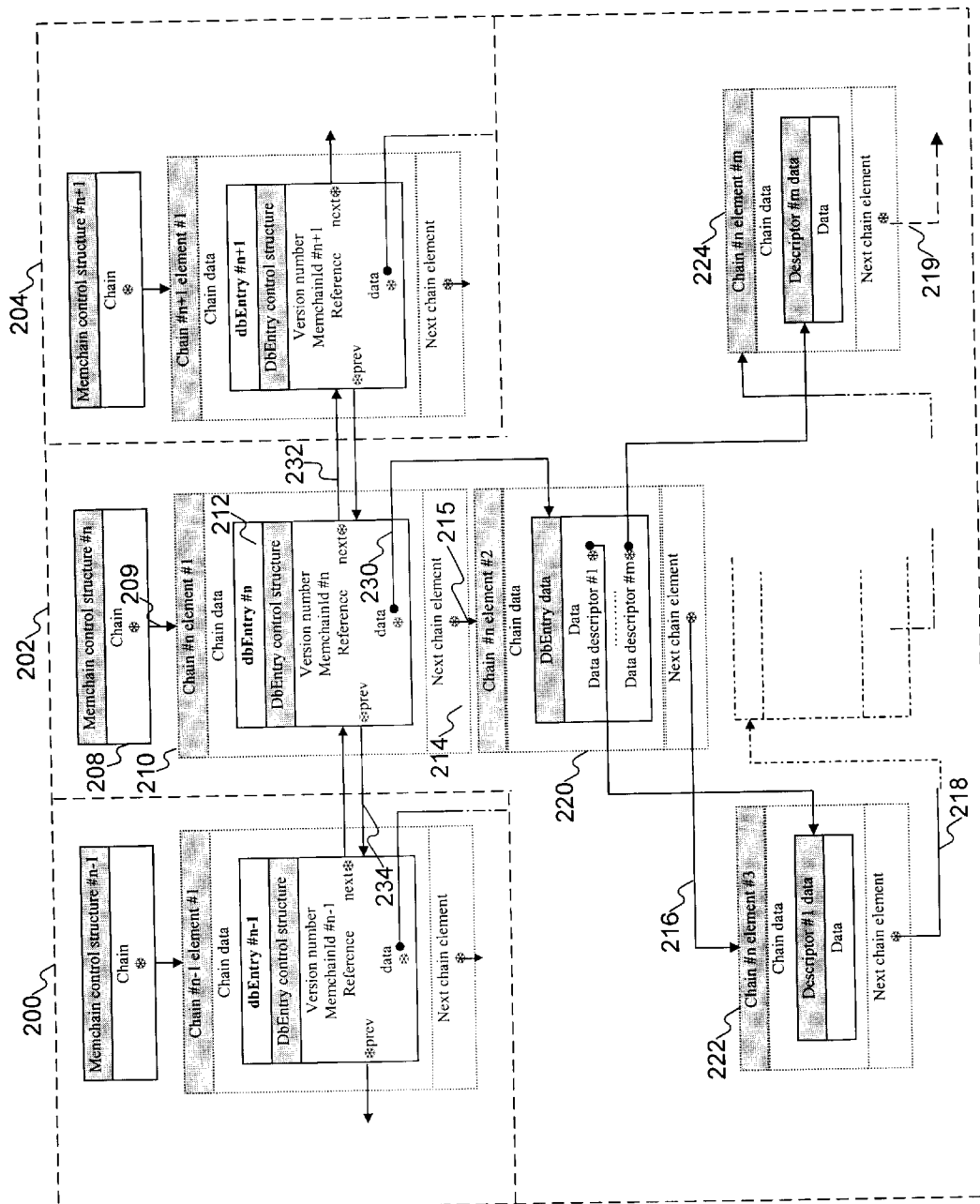
FIG. 4 is a diagram of the database of FIG. 2 shown with database control features.

FIG. 4 illustrates the structure within which, in methods and apparatus consistent with the present invention, database 28 is contained. FIG. 4 shows three dbEntries #n−1, #n, and #n+1, indicated at 200, 202, and 204. DbEntries 200, 202, and 204, may, for example, correspond to program dbEntries 52, 54 and 56 of FIG. 2. Although only the structure of dbEntry 202 will be disclosed in detail, dbEntries 200 and 204 are constructed similarly.

As can be seen in FIG. 4, dbEntry 202 consists of portions 208, 210, 220, 222 and 224. Portion 208 is the memchain control structure. Portions 210, 220, 222, and 224 are memchain elements. Each of the memchain elements is made up of 2 sections: a "data" section, which is reserved for the dbEntry data proper, and a "link" section containing the address of the next portion of memory allocated for this specific dbEntry. For example, portion 210 includes a data section 212 and a link section 214. All portions of memory belonging to the same dbEntry are thus chained together forming a memchain.

When a dbEntry is created, the memchain control structure, such as 208, is first allocated and a unique memchain ID is assigned to the new chain/dbEntry. Then, a first portion of memory, for example, 210, is allocated and its address is stored as a pointer (for example, pointer 209) in a field of the control structure. Every time a new portion of memory is allocated, it is chained to the last allocated portion. Thus, portion 210 includes a pointer 215 in a known location with respect to the starting address of portion 210, independent of the actual amount of dbEntry data in portion 210. Similar pointers 216, 218, and 219 are respectively contained in additional portions (memchain elements) 220, 222, and 224. Thus, in order to delete a dbEntry, all that is necessary is to read the memchain ID present in the dbEntry basic structure, access the corresponding memchain control structure, go through the pointer chain, and free the portions of memory one by one. The memory allocation and management function thus has no need to know the specific size and format of each individual memory portion.

The memchain "data" sections, which correspond to the dbEntry proper, are further organized as follows: the basic section of the dbEntry (portion 212 in FIG. 4) acts as the control structure for the dbEntry. It includes the version number of the system control data table (MPEG or PSIP) from which the dbEntry was created. The control section further includes a memchain ID number and the "reference" field described above, to prevent a dbEntry/memchain from being deleted from memory while the data contained therein is still being accessed by a processor task. Finally, the control structure includes a "data" pointer 230, a "next" pointer 232, and a "previous" pointer 234. The "data" pointer permits tasks of processor 18 to access the actual data contained in dbEntries. The "next" and "previous" pointers are used to link in a single list all the dbEntries of a specific type (channel dbEntries, event dbEntries, etc.).

Figure 5A:
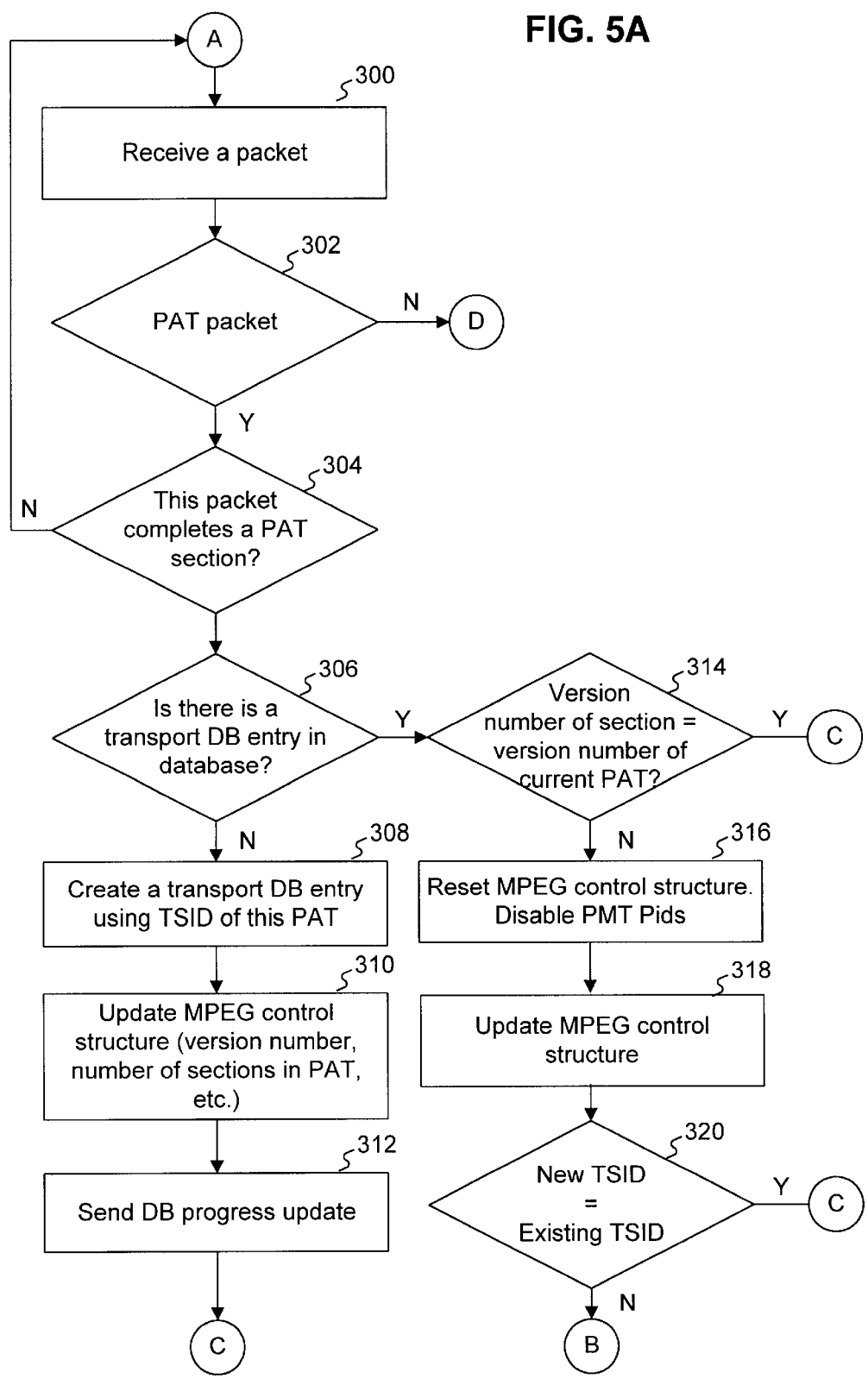
FIGS. 5A–5H are a detailed flow chart of a method, consistent with the present invention, for building and maintaining the database of FIGS. 2 and 4.
Figure 5B:
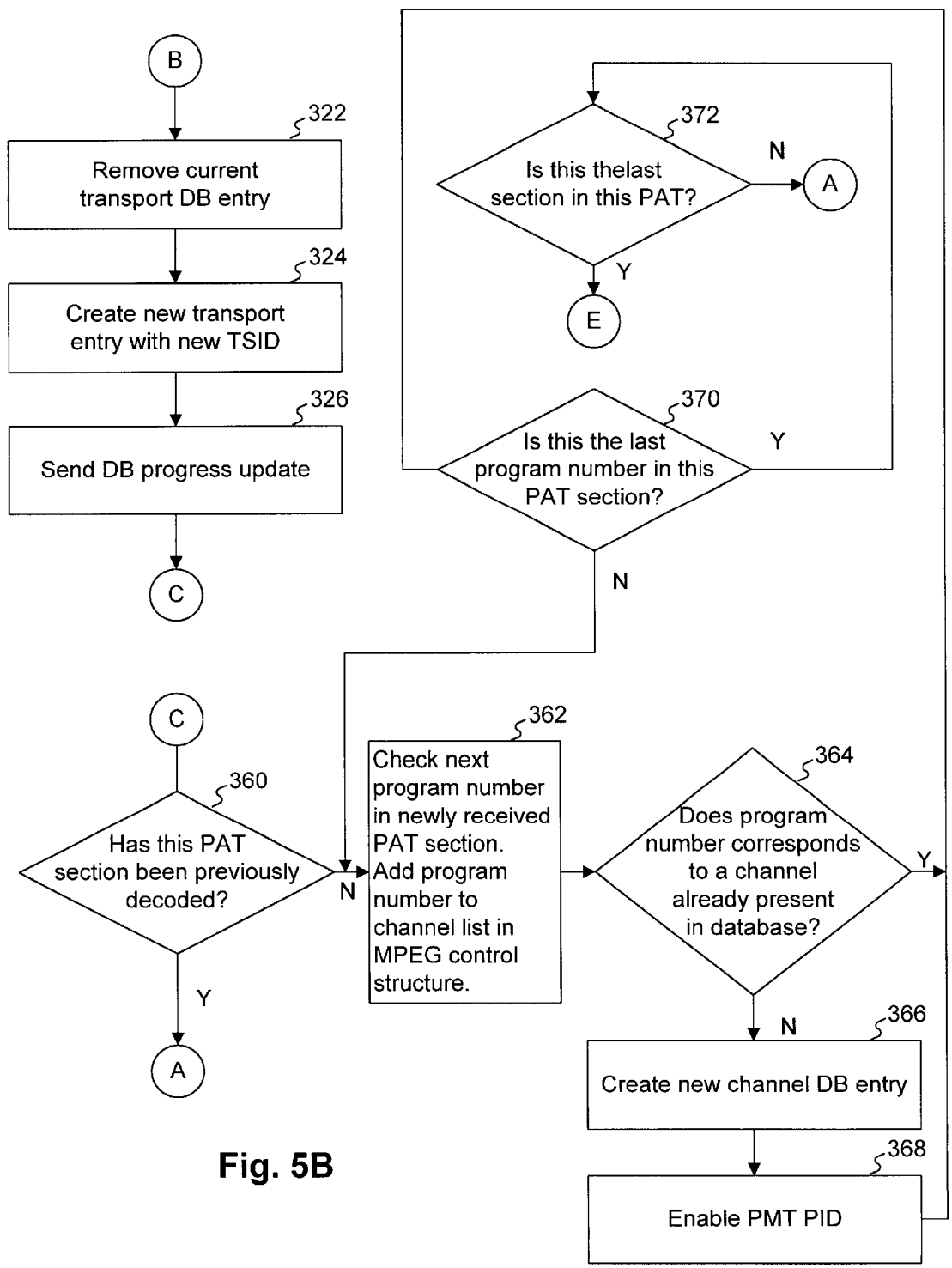
Figure 5C:
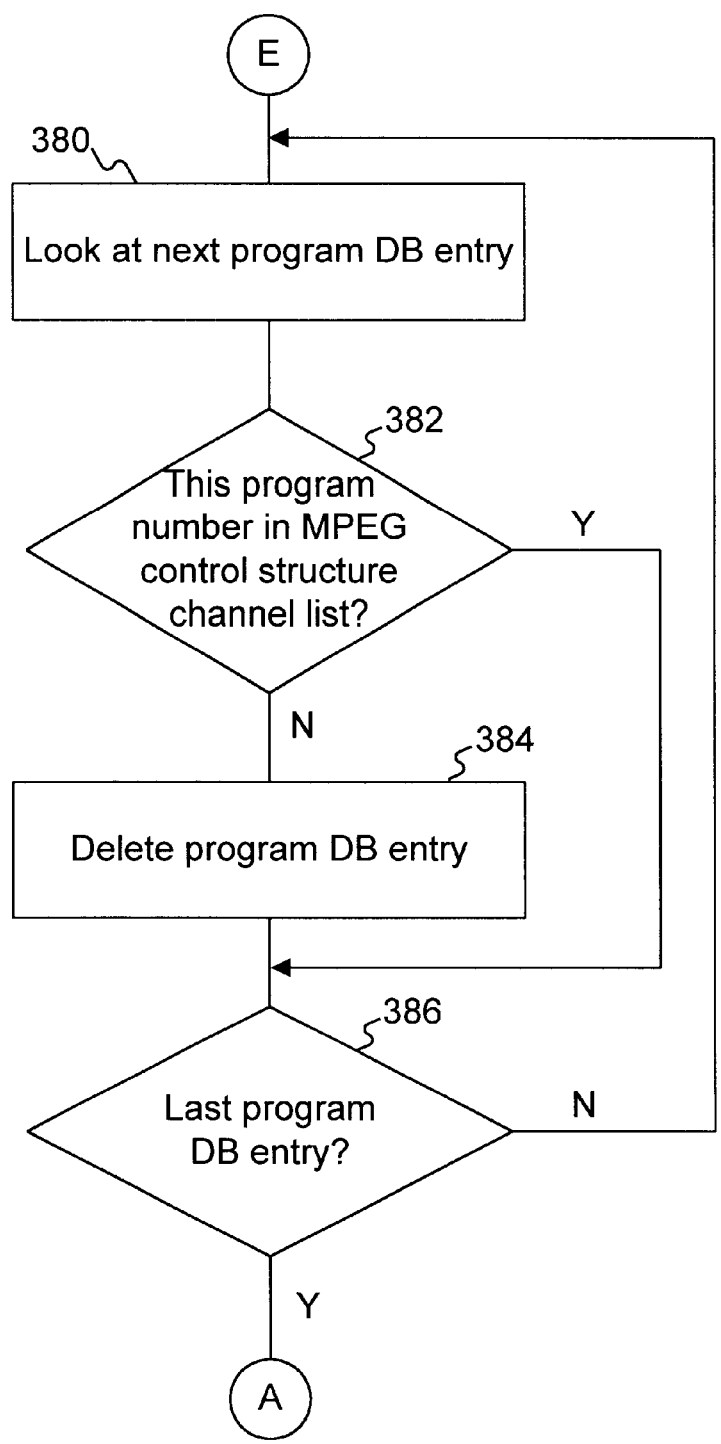
Figure 5D:
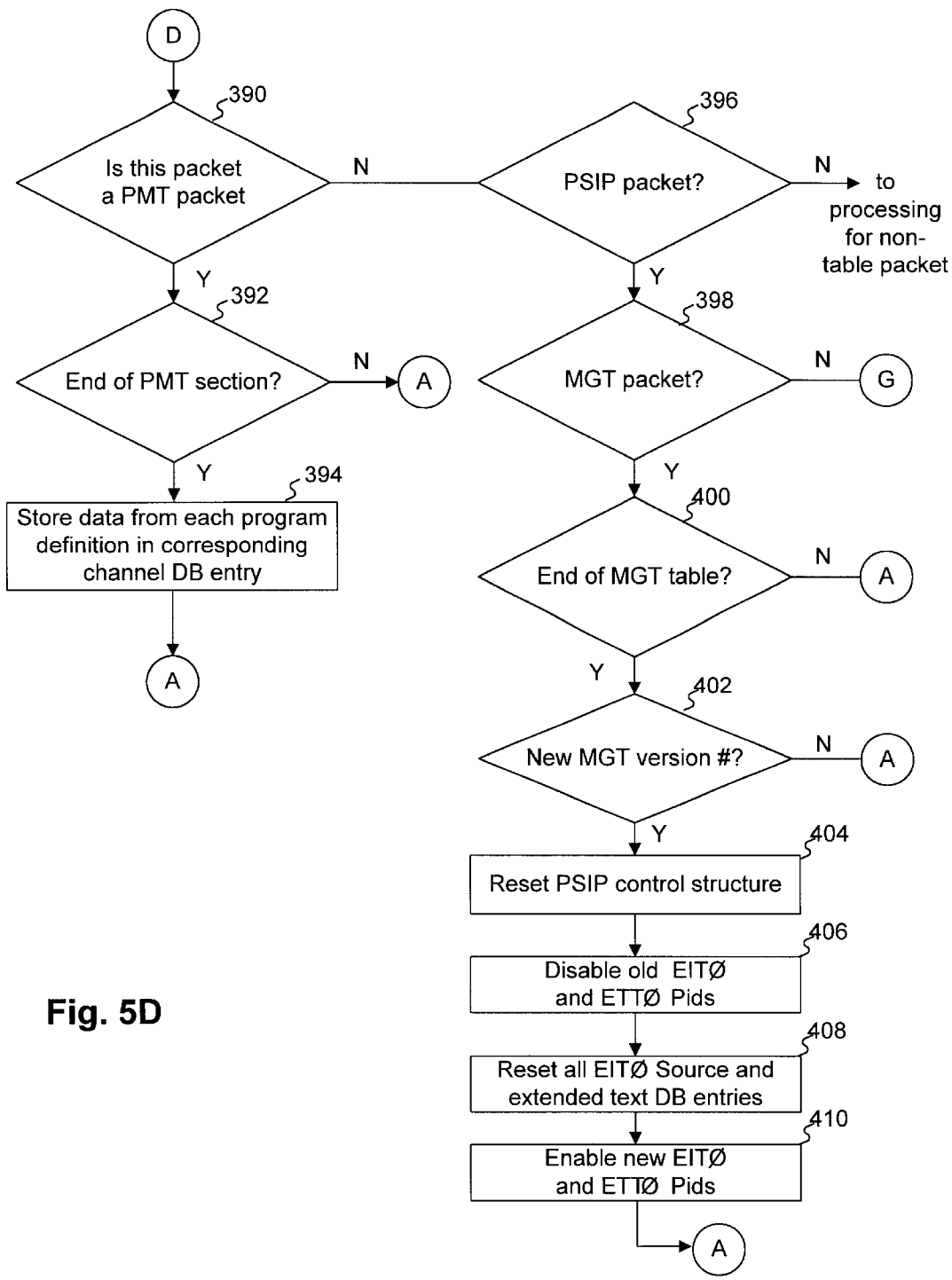

FIGS. 5A–5H show the method of FIG. 2 in greater detail. As shown in FIG. 5A, the first stage 300 of the method receives a packet of system control data from the multiplexer 16. At stage 302, it is determined whether or not the packet constitutes PAT data. If so, the method determines whether the packet constitutes the end of a section of PAT data as determined at stage 304. If not, the data is temporarily stored and the method returns to stage 300.

If the packet completes a PAT section, the method at stage 306 determines whether database 28 currently contains a transport dbEntry. If not, a transport dbEntry is created in database 28 at stage 308, using the TSID of this PAT. At stage 310, the method then updates the MPEG control structure, including information such as version number, number of sections in the PAT, etc. A db progress update is then sent at stage 312 to all tasks of control module 18 which can generate queries to this portion of the database. The method then proceeds to a decode check at stage 360 to be described below.

If it is determined in stage 306 that a transport dbEntry already exists in database 28, then a determination is made at stage 314 if the version number of the recently received PAT section is equal to the version number stored in the existing transport dbEntry. If so, the method proceeds to decode section 360. If not, the method, at stage 316, resets the MPEG control structure and disables all packet identifiers (PIDs) of previously received Program Mapping Table information. At stage 318, the MPEG control structure is updated with the data contained in the recently received PAT section. It is then determined at stage 320 if the transport stream identifier (TSID) contained in the recently received PAT section is equal to the TSID stored in the existing transport dbEntry. If so, the method proceeds to decode section 360. If not, the method removes the current transport dbEntry from database 28, creates a new transport dbEntry with the TSID from the recently received PAT section, and sends a database progress update, as indicated at stages 322, 324, and 326.

The method then executes a decode check at stage 360 (FIG. 5B) to determine if the recently received PAT section has been previously decoded. If so, the data has previously been stored in the database and the method returns to stage 300 to receive a new packet. If the PAT section has not been previously decoded, the method checks the next program number in the newly received PAT section and adds this program number to the channel list in the MPEG control structure, as shown in stage 362. The method then determines at stage 364 if this program number corresponds to a channel which is already present in the database. If not, the method, at stages 366 and 368, creates a new channel dbEntry and enables the PID of the Program Mapping Table for this particular channel, to permit future reception of PMT data.

After enabling the PMT PID or if the program number was already present in the channel database, the method determines at stage 370 if all program numbers of this PAT section have been processed. If not, processing of the next program number continues at stage 362. If this is the last program number in this PAT section, a determination is made at stage 372 if this is the last section of the PAT. If not, the method returns to stage 300 to receive the next packet. If this is the last PAT section, the method proceeds to stages 380–386 (FIG. 5C) to remove program dbEntries or programs no longer present in the transport stream.

Returning now to stage 302 (FIG. 5A), if the recently received packet is not a PAT packet, the method proceeds to stages 390, 392, and 394 (FIG. 5D) to store data from each program definition in a corresponding channel dbEntry if the packet is determined to be the last PMT packet in a section. If the recently received packet is not a PMT packet as determined in stage 390, the method determines at stage 396 if the recently received packet is a PSIP packet. If not, the packet is determined to be a packet other than a system data control packet and it is processed by other methods not relevant to the present invention. control structure, disable the old EIT0 and ETT0 PIDs, reset all eitSource and extended text dbEntries, and enable EIT0 and ETT0 PIDs, as shown in stages 404, 406, 408 and 410.

Figure 5E:
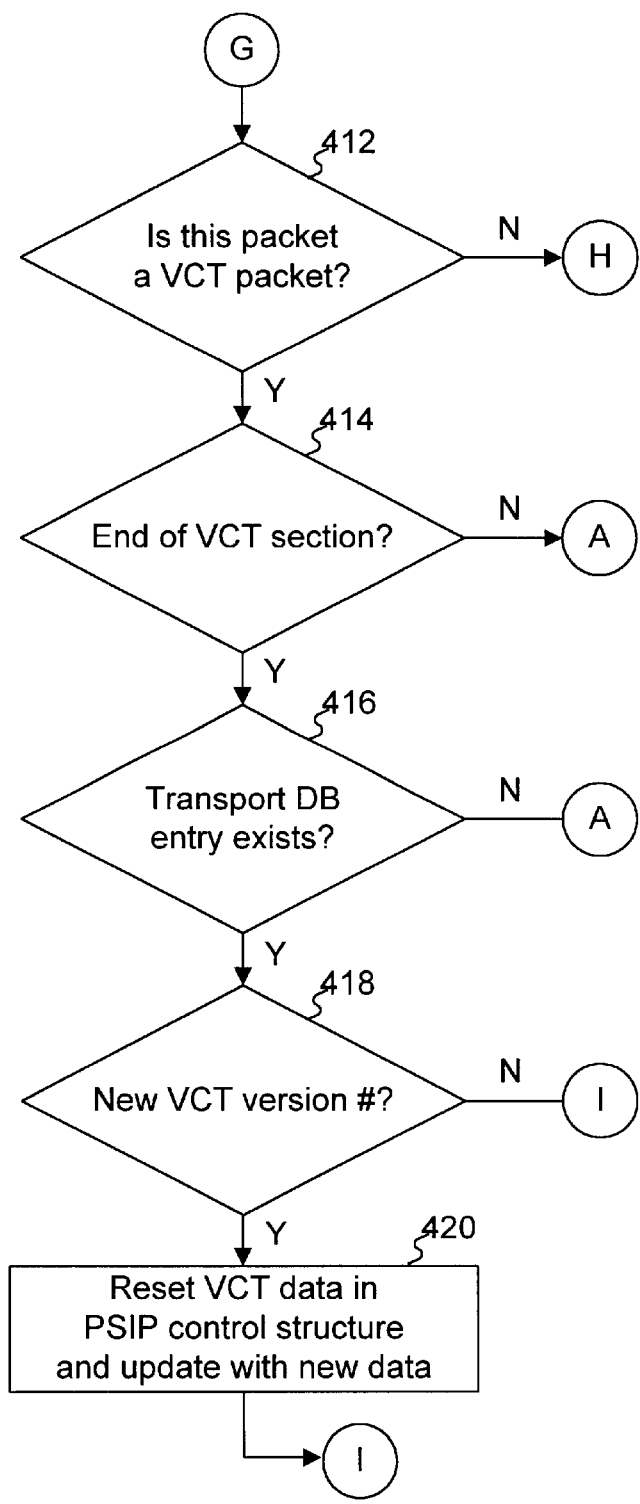
Figure 5F:
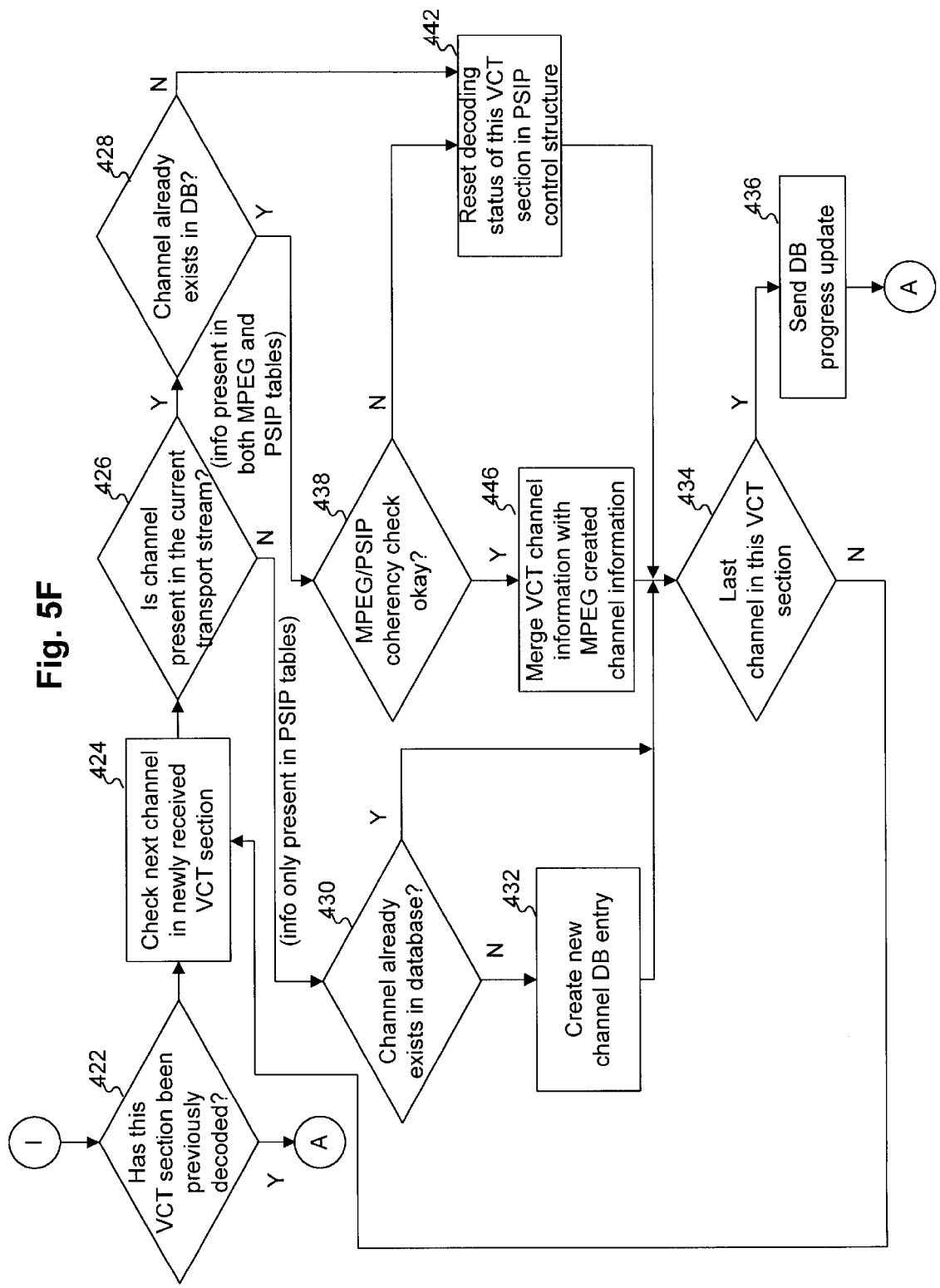
Figure 5G:
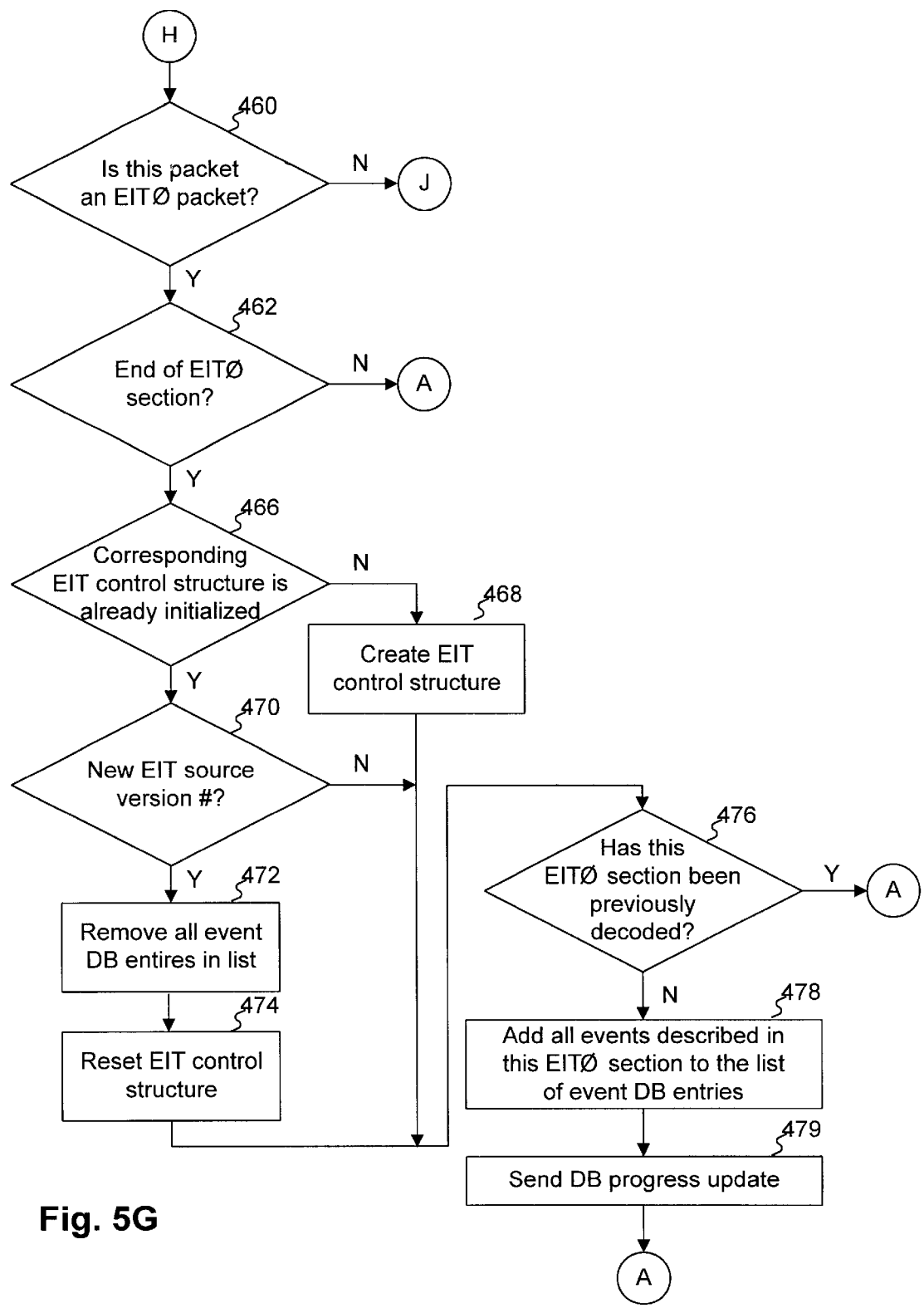

At stage 398, if the recently received packet is not an MGT packet and is a VCT packet, the VCT data is processed and stored in database 28, as indicated by stages 412–442 (FIGS. 5E–5F). In particular, the method performs a coherency check at stage 438 to determine the recently received VCT data is consistent with previously stored MPEG data. Specifically, the coherency check verifies that the number and type of elementary streams for each program are the same in the PSIP tables and the MPEG tables.

If the data is determined to be consistent, the channel information in the recently received data is stored in database 28 information at stage 446, merged with existing MPEG channel information. On the other hand, if the recently received VCT data is not consistent with previously stored MPEG data, the method resets the decoding status of this VCT section in the PSIP control structure 44 at stage 442 such that the VCT data is ignored.

Figure 5H:
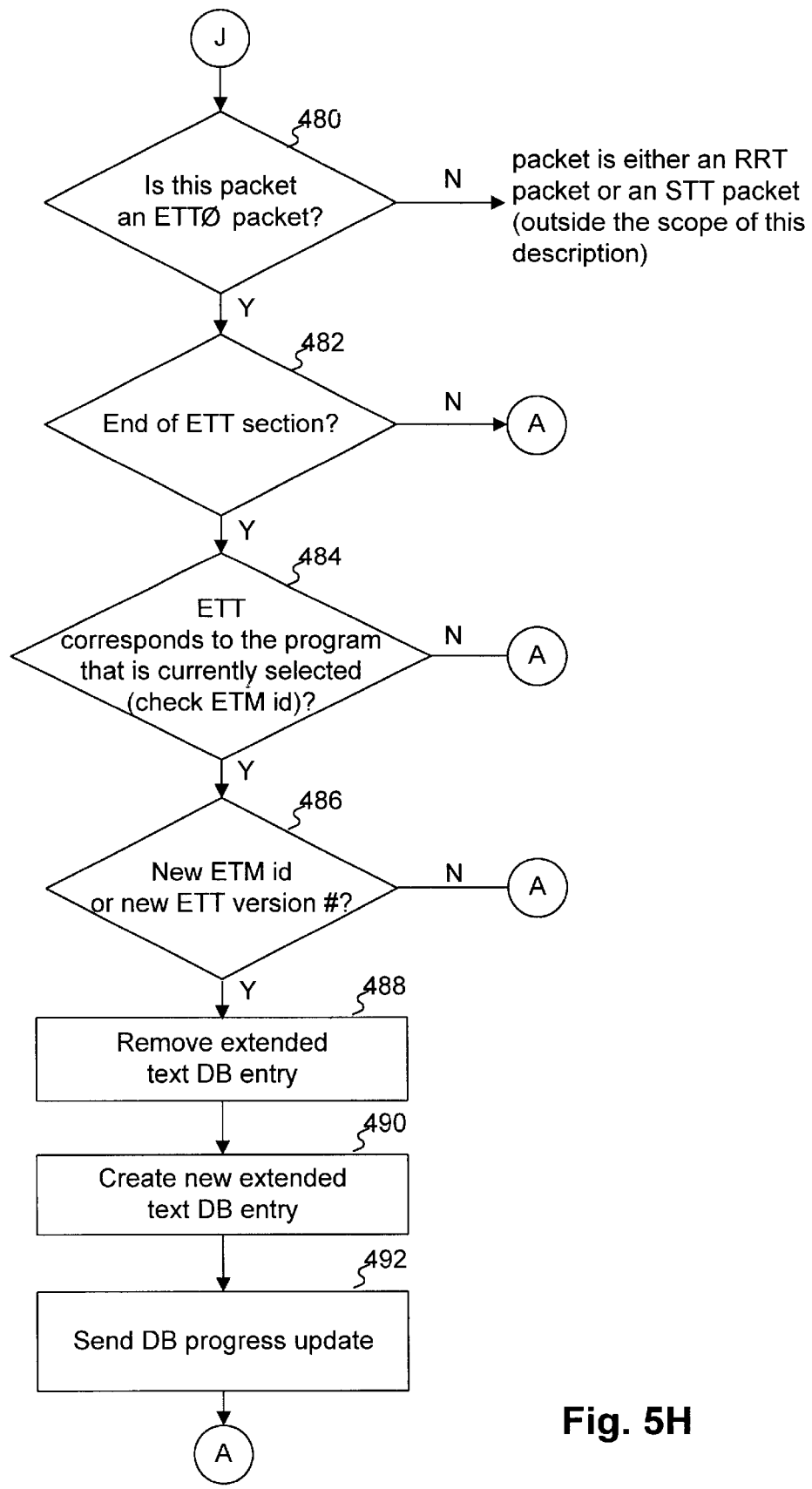

If the recently received packet is not a VCT packet, as determined in stage 412 (FIG. 5E), the method determines if the packet is an EIT0 packet or an ETT0 packet, at stages 460 and 480 (FIG. 5G), respectively. EIT0 packets are processed by stages 462–479 and ETT0 packets are processed by stages 482–492 (FIG. 5H). If the packet is not an ETT0 packet, as determined at stage 480, then the packet is processed as either an RRT packet or an STT packet, in a manner not relevant to the present invention.

Methods and apparatus consistent with the present invention may be implemented in software, hardware, or a combination of hardware and software. Software implementations of the invention are preferably embodied in a computer-readable media, such as a non-volatile read-only memory, or transferred over computer-readable media, such as the Internet.

It will be apparent to those skilled in the art that various modifications and variations can be made in the methods and systems consistent with the present invention without departing from the spirit or scope of the invention. For example, the database could be implemented with a greater or lesser amount of segmentation. Moreover, although the present invention is described in the context of an ATSC transport stream, it is applicable for any stream (transport, program, etc.) that is based on the MPEG-2 and PSIP standards. The true scope of the invention is defined by the following claims.

What is claimed is:

1. A method for maintaining a database for display of digital television broadcast signals carried by a digital broadcast stream including system control data, the system control data including first information relating to a first broadcast standard and optionally also including second information relating to a second broadcast standard, the method comprising:

receiving the digital broadcast stream;

extracting the first information from the system control data;

storing a first set of data entries from the extracted first information;

extracting the second information from the system control data if the second information is present in the system control data; and storing a second set of data entries only if the extracted second information is consistent with the first set of data entries.

2. A method as recited in claim 1 wherein the first information comprises MPEG-2 table information and the second information comprises ATSC table information.

3. A method as recited in claim 2 wherein storing a first set of entries comprises:

storing a first portion of the first set of data entries;

receiving additional system control data;

extracting additional first information from the additional system control data; and storing a second portion of the first set of data entries from the extracted additional first information.

4. A method as recited in claim 3 wherein storing a second portion of the first set of data entries comprises storing data from transmitted MPEG-2 Program Mapping Tables.

5. A method as recited in claim 3 wherein storing a second set of data entries comprises storing one of the second data entries only if a second portion of a corresponding one of the first set of data entries has previously been stored.

6. A method as recited in claim 5 wherein storing a second set of data entries comprises storing information contained in transmitted Program and Specific Information Protocol tables.

7. A method as recited in claim 2 wherein the first information includes a version number and the method comprises:

comparing the version number of extracted first information to the version number of a previously stored first set of data entries;

ignoring the extracted first information if the compared version numbers are equal;

constructing a new set of first data entries if the compared version numbers are not equal; and deleting the existing set of previously stored first data entries if the compared version numbers are not equal.

8. A method as recited in claim 2 wherein the first information includes a transport stream ID and the method comprises:

comparing the transport stream IDs of the extracted first information and stored first set of data entries; and resetting the stored first set of data entries and storing a new set of first data entries if the compared transport stream IDs are not equal.

9. A method as recited in claim 2 wherein the first information comprises a plurality of separate sections and at least one program listing, and storing a first set of data entries comprises storing at least one program entry; and wherein the method comprises:

comparing the at least one program listing of the extracted first information to a previously stored program entry;

if the at least one program listing of the extracted first information does not correspond with a stored program entry, storing the at least one program listing of the extracted first information as an additional program entry and creating a new listing in a channel list; and deleting all program entries which do not have a corresponding entry in the channel list only if all sections of the first information have been extracted.

10. A method as recited in claim 2 wherein storing a first set of data entries comprises storing a plurality of program data entries each containing data for a separate MPEG-2 program from an MPEG-2 Program Association Table.

11. A method as recited in claim 2, wherein storing a first set of data entries comprises storing a data entry with a corresponding database link structure.

12. A method as recited in claim 11, wherein:

storing a first set of data entries comprises storing at least one data entry over a plurality of noncontiguous portions of memory; and the database link structure includes pointers linking the noncontiguous portions of memory.

13. A method as recited in claim 11, wherein the database link structure includes a reference field manipulated by external tasks to indicate pending uses of a corresponding data entry by external task.

14. A method as recited in claim 13 comprising:

generating a delete request to delete a data entry upon detection of a selected condition; and executing the delete request only if a corresponding reference field indicates no pending uses of the corresponding data entry.

15. A system for maintaining a database for display of digital television broadcast signals carried by a digital broadcast stream including system control data, the system control data including first information relating to a first broadcast standard and optionally also including second information relating to a second broadcast standard, the system comprising:

a memory;

a tuner which receives the digital broadcast stream;

a demultiplexer which extracts the first information from the system control data; and a control module which stores a first set of data entries from the extracted first information in a database in the memory, commands the demultiplexer to extract second information from the system control data if second information is present in the system control data; and stores in the database a second set of data entries from the extracted second information only if the extracted second information is consistent with the first set of data entries.

16. A system as recited in claim 15 wherein the first information comprises MPEG-2 table information and the second information comprises ATSC table information.

17. A system as recited in claim 16 wherein the first set of entries comprises:

a first portion of the first set of data entries extracted from the first information; and a second portion of the first set of data entries extracted from additional first information received at a time following extraction of the first portion of the first set of data entries.

18. A system as recited in claim 16 wherein the second portion of the first set of data entries comprises information extracted from transmitted MPEG-2 Program Mapping Tables.

19. A system as recited in claim 18 wherein the second set of data entries comprises information extracted from transmitted Program and Specific Information Protocol tables.

20. A system as recited in claim 15 wherein the first information includes a version number.

21. A system as recited in claim 16 wherein the first information includes a transport stream ID.

22. A system as recited in claim 16 wherein the first information comprises a plurality of separate sections and at least one program listing, and the first set of data entries comprises at least one program entry.

23. A system as recited in claim 16 wherein the first set of data entries comprises a plurality of program data entries each containing data for a separate MPEG-2 program from an MPEG-2 Program Association Table.

24. A system as recited in claim 16, wherein the first set of data entries comprises a data entry with a corresponding database link structure.

25. A system as recited in claim 24, wherein:

the first set of data entries comprises information stored over a plurality of noncontiguous portions of memory; and the database link structure includes pointers linking the noncontiguous portions of memory.

26. A system as recited in claim 24, wherein the database link structure includes a reference field manipulated by external tasks to indicate pending uses of a corresponding data entry by external task.

27. A system as recited in claim 15, wherein the functions of the tuner, demultiplexer, and control module are performed by a multimedia processor.

28. A computer program product comprising a computer-usable medium having computer-readable code embodied therein for maintaining a database for display of digital television broadcast signals carried by a digital broadcast stream including system control data, the system control data including first information relating to a first broadcast standard and optionally also including second information relating to a second broadcast standard, the computer-usable medium comprising:

a component configured to receive the digital broadcast stream;

a component configured to extract the first information from the system control data;

a component configured to store a first set of data entries from the extracted first information;

a component configured to extract second information from the system control data if second information is present in the system control data; and a component configured to store a second set of data entries only if the extracted second information is consistent with the first set of data entries.

* * * * *